United States Patent [19]

Shuler, Jr.

[11] Patent Number: 4,912,629
[45] Date of Patent: Mar. 27, 1990

[54] REAL-TIME GARBAGE COLLECTION FOR LIST PROCESSING USING RESTRUCTURED CELLS FOR INCREASED REFERENCE COUNTER SIZE

[75] Inventor: Robert L. Shuler, Jr., Friendswood, Tex.

[73] Assignee: The United States of America as represented by the Administrator of the National Aeronautics and Space Administration, Washington, D.C.

[21] Appl. No.: 878,916

[22] Filed: Jun. 26, 1986

[51] Int. Cl.$^4$ .......................... G06F 9/00; G06F 12/00
[52] U.S. Cl. .................................. 364/200; 364/281.1; 364/280
[58] Field of Search ... 364/200 MS File, 900 MS File, 364/300

[56] References Cited

U.S. PATENT DOCUMENTS

| | | | |
|---|---|---|---|
| 4,016,545 | 4/1977 | Lipovski | 364/900 |
| 4,121,286 | 10/1978 | Venton et al. | 364/200 |
| 4,193,115 | 3/1980 | Albus | . |
| 4,215,397 | 7/1980 | Hom | 364/101 |
| 4,432,057 | 2/1984 | Daniell et al. | 364/300 |
| 4,435,752 | 3/1984 | Winkelman | 364/200 |
| 4,435,766 | 3/1984 | Haber et al. | 364/300 |
| 4,447,875 | 5/1984 | Bolton et al. | 364/200 |
| 4,463,424 | 7/1984 | Mattson et al. | 364/200 |
| 4,502,118 | 2/1985 | Hagenmaier et al. | 364/200 |
| 4,558,413 | 12/1985 | Schmidt et al. | 364/300 |
| 4,695,949 | 9/1987 | Thatte et al. | 364/200 |
| 4,716,524 | 12/1987 | Oxley et al. | 364/200 |
| 4,758,944 | 7/1988 | Bartley et al. | 364/200 |
| 4,775,932 | 10/1988 | Oxley et al. | 364/200 |

OTHER PUBLICATIONS

"Dynamic Page Reference Counter," IBM Technical Disclosure Bulletin, vol. 21, No. 8, Jan. 1979, J. N. McCauley and J. A. Wingert, (pp. 3139-3140).

"Efficient Real-Time Garbage Collection for LISP," Jun. 27, 1985, Robert L. Shuler, Jr.
"Performance Analysis of On the Fly Garbage Collection," Communications of the ACM, vol. 27, No. 11, Nov. 1984, Tim Hickey and Jacques Cohen, (pp. 1143-1154).
"Garbage Collection of Linked Data Structures," ACM Computing Surveys, vol. 13, No. 3, Sep. 1981, Jacques Cohen, (pp. 341-367).
"A Real-Time Garbage Collector Based on the Lifetimes of Objects," Communications of the ACM, vol. 26, No. 6, Jun. 1983, Henry Lieberman and Carl Hewitt.
"LISP," 2nd Ed., Addison-Wesley, 1984, Patrick Henry Winston and Berthold Klaus Paul Horn, (p. 141).
"An Efficient Machine-Independent Procedure for Garbage Collection in Various List Structures," Communications of the ACM, vol. 10, No. 8, Aug. 1967, H. Schorr and W. M. Waite, (pp. 501-506).

Primary Examiner—Gareth D. Shaw
Assistant Examiner—Kevin A. Kriess
Attorney, Agent, or Firm—Russell E. Schlorff; John R. Manning; Edward K. Fein

[57] ABSTRACT

In a list processing system, small reference counters are maintained in conjunction with memory cells for the purpose of identifying memory cells that become available for re-use. The counters are updated as references to the cells are created and destroyed, and when a counter of a cell is decremented to logical zero the cell is immediately returned to a list of free cells. In those cases where a counter must be incremented beyond the maximum value that can be represented in a small counter, the cell is restructured so that the additional reference count can be represented. The restructuring involves allocating an additional cell, distributing counter, tag, and pointer information among the two cells, and linking both cells appropriately into the existing list structure.

22 Claims, 8 Drawing Sheets

REAL-TIME GARBAGE COLLECTION FOR LIST PROCESSING USING RESTRUCTURED CELLS FOR INCREASED REFERENCE COUNTER SIZE

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to data processing systems and their arrangements for allocation and deallocation of memory space, particularly to an improved mechanism for keeping track of the number of active references to a memory cell in a list processing system.

DESCRIPTION OF PRIOR ART

Many present data processing systems are concerned with the manipulation of linked list structures. Each memory cell in a list contains pointers, which refer either to other list fragments, or to fundamental data items which are called atoms. Atoms, which can be symbols or numbers, may also refer to another atom or to a list. New lists are constructed by allocating vacant cells from a free list, and placing into them pointers to existing lists, pointers to fragments of lists, or pointers to atoms. Pointers within existing lists are not normally modified, and thus several lists or atoms may reliably refer to the same underlying list fragment as part of their value, without having to make their own copy. The above described manipulation of linked list structures is termed list processing. It is implemented in specialized data processors designed particularly for list processing, and also in general purpose data processors.

All accessible memory cells may be reached either by tracing down a list referenced by an atom, by tracing down a list referenced by a stack entry, or by tracing down the free list. As the values of atoms and the stack change, some cells become inaccessible. Identifying these cells and adding them back to the free list is called garbage collection.

In a survey by Cohen, "Garbage Collection of Linked Data Structures," ACM Computing Surveys, September 1981, pp. 341-367, garbage collection strategies are classified as two main types: (1) mark and sweep, and (2) reference counter based. The basic mark and sweep strategy is to trace down all lists from the base atoms and stack entries, marking each accessible memory cell by setting a bit provided for that purpose. Then memory is scanned, and all unmarked cells are reclaimed. The mark bits are usually also reset during this scan. Processing must be halted while the marking operation is in progress, which can result in large delays. These unanticipated delays cause inconvenience, not to mention outright failure, in systems which must exhibit real time or conversational response, such as process control or spoken natural language communication. In addition to the delay of waiting on the collector to find new free cells, data structures typically become scattered through a large area of memory. In a paging virtual memory system this results in page thrashing, which degrades response time and generally limits the amount of work that can be done by the machine. One improvement to mark and sweep strategies is to use two bits, and a more complicated marking process which is able to proceed without halting the list processor. One such strategy is disclosed in U.S. Pat. No. 4,121,286 Venton, et. al. However, according to Hickey, "Performance Analysis of On-the-Fly Garbage Collection," Communications of the ACM, Nov. 1984, pp. 1143-1154, up to three times as much processing power may need to be devoted to garbage collection as to list processing in order to guarantee that list processing need never halt to wait for the collector to find a needed free cell.

A relative of mark and sweep, Baker's Algorithm, is the method used in many commercial list processing systems. This method involves partitioning memory into at least two spaces, evacuating structures from one space to the other, and leaving behind forwarding pointers in the evacuated space. The "to-space" is then purged of all references to the evacuated space via a linear scan in which all pointers to the evacuated "from-space" are replaced with the forwarding pointer. Copying a cell to the "to-space" is equivalent to marking. Another advantage of Baker's algorithm is that cells are allocated sequentially from to-space. A variant of Baker's algorithm is described by Lieberman, "A Real-Time Garbage Collector Based on the Lifetimes of Objects," Communications of the ACM, June 1983, pp. 419-429.

The second method described by Cohen requires keeping a reference counter for each cell, which is incremented when a new pointer to the cell is created, and which is decremented when a pointer is destroyed. When the counter is decremented to zero, the cell may be immediately reclaimed and added back to the free list, thus guaranteeing no delays in finding free cells. Where large cells or blocks of storage are being infrequently manipulated, such as in certain operating system data structures, reference counters have long been used. Their use has not been as common in list processing systems because of the overhead in storing and updating the counters, and because of their inability to reclaim cyclic lists.

Experts disagree over the importance of reclaiming cyclic lists. For example Winston, in his widely used text LISP, 2nd Ed., Addison-Wesley, 1984, p. 141, points out the inadvisability of any structure requiring modification of existing list cells (construction of cyclic lists requires the sort of list modification which renders multiple references to common underlying list fragments unreliable; cyclic structures also render certain processing operations interminable). Lieberman, in the above mentioned article, considers use of cyclic lists to be an important technique.

Overhead is a problem because counters must be theoretically as large as a pointer, and must be kept current. Cohen mentions methods that have been suggested to alleviate one or both the overhead problems for reference counters. The earliest is based on the observation that most reference counters will be small; in fact, many will never exceed one or two. In this method, when a counter reaches its maximum value it is no longer updated. When and if memory is finally exhausted, a conventional mark and sweep method is used to reclaim cells with maximum value counters, and to reclaim cyclic lists. U.S. Pat. Nos. 4,447,875 and 4,502,118 disclose a very specialized type of list processing system, called a Reduction Processor, having a garbage collection system which uses reference counters in conjunction with mark and sweep.

A more sophisticated method of employing small reference counters, described in Cohen's article, is to assume all cells have a reference count equal to "one," unless the cell is entered in one of several hash tables. The hash table for cells with counts greater than one stores explicitly a counter of necessary maximum size. The tables are not updated immediately, however, due to overhead. Rather, a log of transactions is kept, and the tables are periodically updated; which gets back to the situation of occasional delays. One commercial vendor of list processing machines states that reference counters and tables are used, and these machines exhibit visible pauses for garbage collection.

U.S. Pat. No. 4,435,766, although not related to list processing or to garbage collection, discloses something which is primitively like a reference counter. This is called a lock counter, and is used to count the number nested resource locks created by a process on a resource, such as a computer peripheral.

Other United States Patents containing teachings of garbage collection in list processing systems, reference counting, replication, cache partitioning, and memory expansion are No. 4,432,057, Daniell, et. al.; No. 4,193,115, James Albus; No. 4,215,397, Gim Hom; No. 4,558,413, Schmidt and Lampson; and No. 4,463,424, Mattson and Rodriguez-Rosell.

OBJECTS OF THE INVENTION

It is an object of the present invention to provide an improved reference counter garbage collection mechanism for list processing, which has the advantages of small reference counters, while retaining the absolute determinacy and most of the simplicity of full sized counters.

Additional objects of the invention include: reduction of the overhead of updating reference counters; elimination of memory fragmentation typically caused by mark and sweep methods; and reduction of the complexity and overhead of other reference counter systems attempting to employ small counters.

Another object is to provide these advantages in such a way that they can be incorporated into data processing systems of the type currently in use, with a minimum of impact to the design and operation of these systems.

It is also an object of the invention to provide a method of garbage collection which is simple and robust enough to be used in next generation systems, especially those with large memories or employing highly parallel processing.

It is a further object of the invention to provide practical real-time list processing garbage collection.

Further objects and advantages of the present invention will become apparent from a consideration of the drawings and ensuing description thereof.

SUMMARY OF THE INVENTION

According to the invention, a reference counter of arbitrarily small size is kept for each cell. Each time a new pointer to the cell is created the counter is incremented, and each time a pointer to the cell is destroyed the counter is decremented. When the counter becomes zero the cell is returned to the free list. When any pointers within said cell are in turn destroyed, the counters of the cells to which they point are similarly decremented and checked for zero.

On the occasion that a counter can no longer be meaningfully incremented because it has reached its maximum value, an additional cell is obtained. Then the contents of the original cell, some additional count information, and linking information to relate the two cells to the former list structure, are stored in the two cells. The additional count information is incremented to reflect the new reference. The new reference pointer value will be adjusted to point appropriately within the new cell structure.

By the above method, all inaccessible cells are immediately identified and reclaimed; thus there is never an unanticipated delay when needing a free cell. The fixed and deterministic overhead of updating counters is accepted in lieu of the unpredictable delays of all systems which do not immediately identify and reclaim inaccessible cells. With small reference counters the overhead can be made quite small; less, in fact, than that of mark and sweep systems which either must use a lot of processing power to continuously locate inaccessible cells, or suffer degradation due to memory fragmentation.

DESCRIPTION OF THE PREFERRED EMBODIMENT

Figure 1:
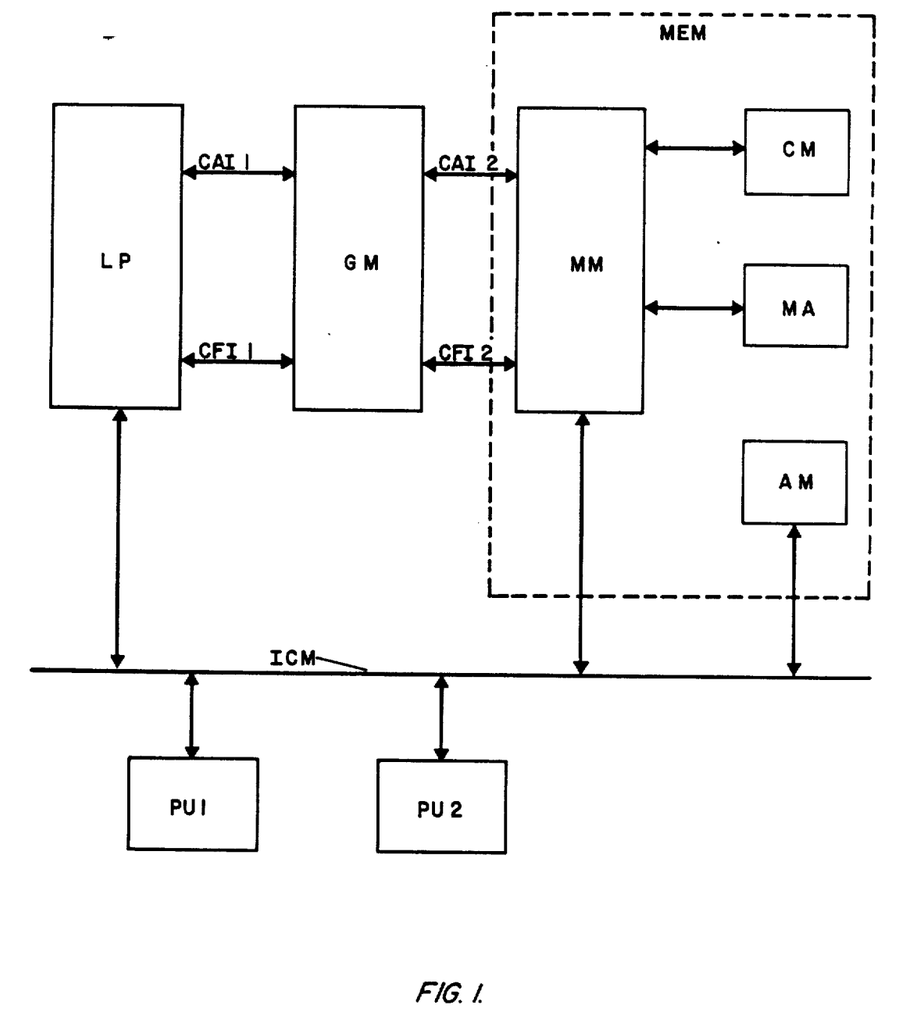
FIG. 1 is a diagrammatic view of a list processing system showing the invention incorporated therein.

Referring first to FIG. 1 brief consideration will be given to a typical list processing system organized on a modular basis suited to the invention. The system comprises (i) a central processing unit or list processor LP, (ii) a memory system MEM, (iii) peripheral units PU1, PU2, AM, (iv) a garbage manager GM, and (v) an intercommunication medium ICM for memory to processor or peripheral unit communication. Modules include the provision of needed control information about when references to memory cells are being created and destroyed, and the provision of space within the cell format for storing a reference counter. The arrangement and quantity of the various modules shown in FIG. 1 are typical only and not intended to be limiting.

INTERFACE TO THE LIST PROCESSOR

The list processor LP is provided with a cell access interface CAI1 for retrieving or updating the contents of memory cells. Such accesses from the list processor LP to the memory system MEM are intercepted by the garbage manager GM, which is interposed between the list processor LP and the memory system MEM. The memory system MEM as shown in FIG. 1 is comprised of a memory manager MM, a cache memory CM, a main memory MA, and an auxiliary memory AM which is typically a peripheral unit such as a disk used as a backing store. Some data processing systems may omit or add elements of the memory system MEM.

A second interface to the list processor LP is the control function interface CFI1 which the processor uses to indicate what type of access to memory is being made, and to perform certain control functions. In addition to a retrieve RTV and a store STR function normally associated with memory interfaces, there are special control functions which are normally used only by list processors employing reference counter garbage collection. If these special control functions are not already present, the list processor can be appropriately modified to include them in the control function interface CFI1. The functions which the control function interface CFI1 communicates to the garbage manager GM are:

RTV—Access to retrieve cell contents
STR—Access to store cell contents
NEW—Get a cell from the free list
ADD—Add a new reference to a cell
DEL—Destroy a reference to a cell
EGM—Set the free list pointer and enable garbage manager
DGM—Retrieve free list pointer and disable garbage manager
SDL—Set dynamic space delimiter With each function presented on the control function interface CFI1, the list processor LP also provides a cell address on the cell access interface CAI1. With access functions, the list processor LP will also provide cell content data (STR), or expect cell content data to be provided to it (RTV). The control function interface CFI1 is also used to return status and exception information to the list processor LP, as for example whether the function was successfully completed, and if not why.

There is also a cell access interface CAI2 and control function interface CFI2 from the garbage manager GM to the memory MEM, which are similar to the cell access interface CAI1 and control function interface CFI1, except that the control function interface CFI2 provides only access (retrieve and store) functions. The cell access interfaces CAI1 and CAI2 and the control function interface CFI2 may be part of the intercommunication medium ICM; however, the control function interface CFI1, because of the various unique functions described above, will be specialized.

DIVISION OF RESPONSIBILITY

In a typical list processing system there are several tasks, each with its own logical area of memory. There may also be more than one method of garbage collection available. It is desirable, therefore, that the initiation and termination of the operation of the garbage manager GM for specified areas of memory be controlled by the list processor LP.

When the list processor LP wishes the garbage manager GM to manage free space in an area of memory, it links the free cells in that area into a free list. If there are pre-existing list structures in the area which were not maintained under garbage manager GM control, the list processor LP computes and stores correct values for their reference counters. The list processor LP then transmits the address of the head of the free list to the garbage manager GM, along with the enable function EGM, which initiates garbage manager GM control of the free list. After that point, the garbage manager GM assumes all control of the free list, and the list processor LP retains control of all list elements traceable from atoms and stack entries. The list processor LP may regain full control and retrieve the free list pointer by issuing the disabling command DGM on the control function interface CFI1. The garbage manager GM may also notify the list processor LP of exceptional conditions, such as free list exhaustion, using the control function interface CFI1.

DATA STRUCTURES

Figure 2:
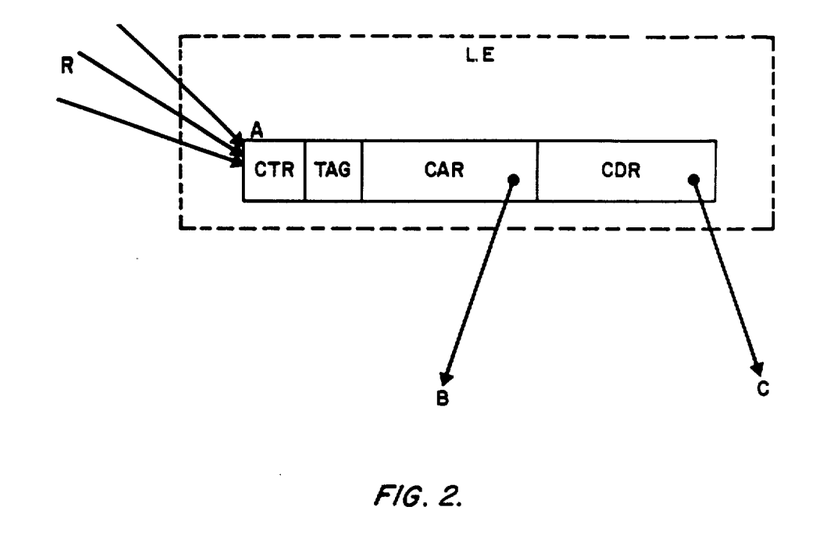
FIGS. 2 and 3 show the structures of a standard cell and an expanded cell, respectively.

FIG. 2 shows the format of a list element LE, comprised of a cell A, to which there are small numbers of references R. A description of each field of bits within cell A is as follows:

CTR—reference counter having a range of possible values from 2 to the Nth power of 2, where N is the number of bits allocated for the counter.
TAG—a code used by the list processor to indicate the type of cell or other memory data item, in this case an appropriate code to indicate a standard small counter cell.
CAR—the first of the two pointers contained in the cell.
CDR—the second pointer contained in the cell.

Figure 3:
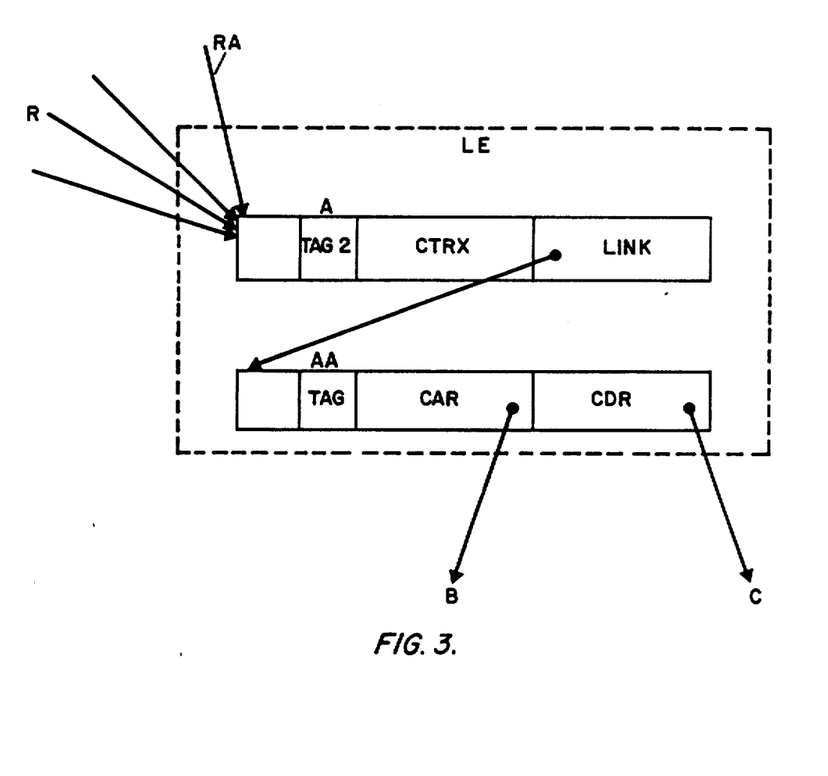

FIG. 3 shows the same list element as FIG. 2, with an additional reference RA, exceeding the capacity of reference counter CTR. As will be explained subsequently, two physical memory cells are now used to represent list element LE. The original cell A has been modified to contain an expanded reference counter CTRX in place of its first pointer CAR, a link pointer LINK to a second cell in place of its second pointer CDR, and an appropriate tag TAG2 to indicate the format of the cell. A second cell AA contains the TAG, CAR, and CDR of the original cell.

OPERATION OF THE GARBAGE MANAGER

The garbage manager GM is a sequential state machine implementing the process states of FIGS. 5 through 8 as described below. The garbage manager GM has the purposes of maintaining the reference counters and the free list, and of handling memory references on behalf of the list processor LP so that the list processor LP need not normally concern itself with those aspects of cell format which have to do with various reference counter configurations.

Figure 4:
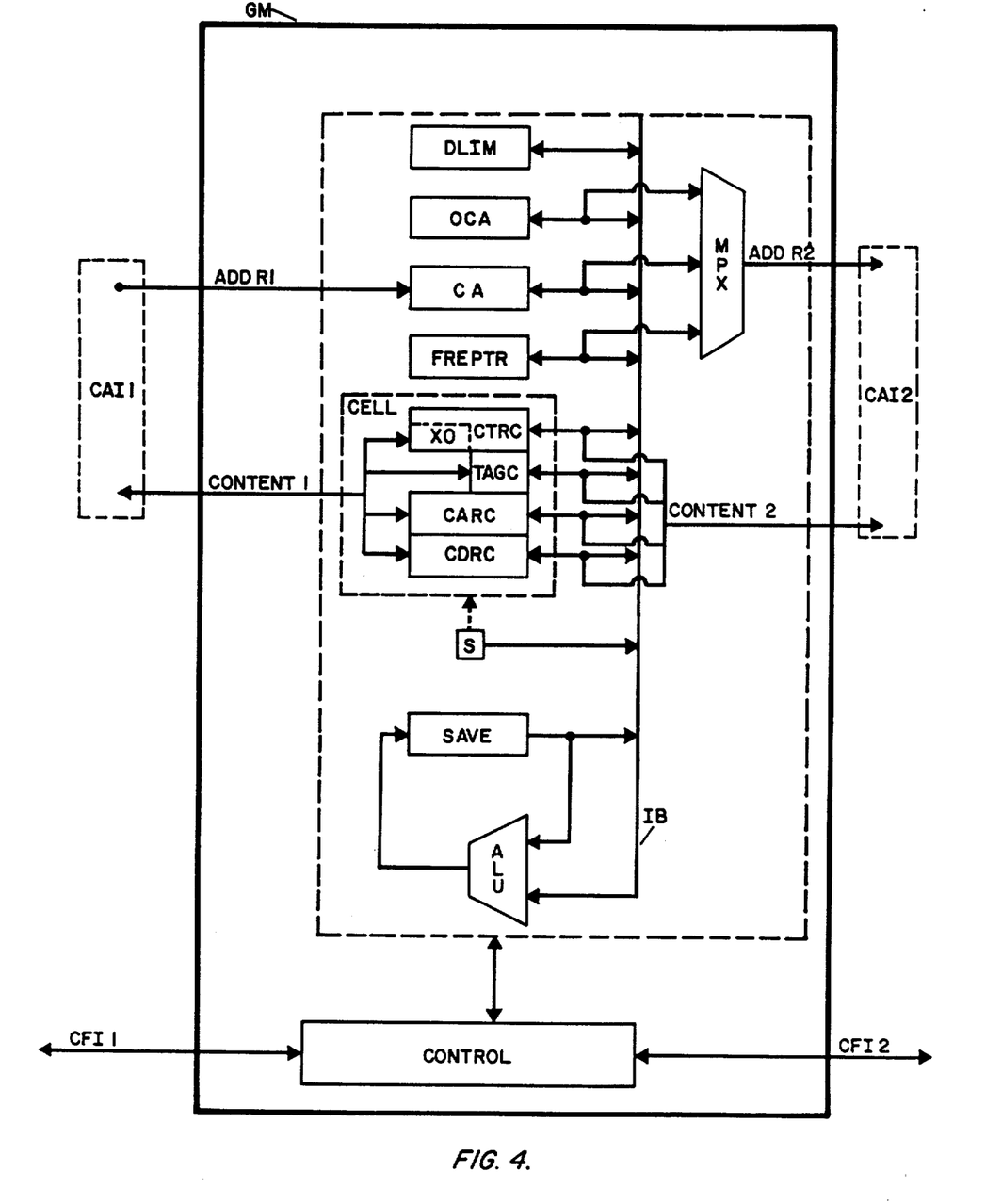
FIG. 4 is a diagrammatic view of the registers and data paths used by the garbage management system.

The garbage manager GM has internal storage registers, data paths, and functional units as shown in FIG. 4. When the list processor LP requests a function of the garbage manager GM, it sends the appropriate function code on the control function interface CFI1, sends cell address information on the address portion ADDR1 of the cell access interface CAI1 to a cell address register CA, and sends and accepts cell content and other information on the content portion CONTENT1 of the cell access interface CAI1 to a group of cell content registers CELL, which include: a reference counter CTRC, an extended reference counter portion XC, a tag TAGC, a first pointer CARC, and a second pointer CDRC. Similarly, the garbage manager GM uses the cell address register CA and cell content registers CELL to communicate with the memory manager MM over the control access interface CAI2, along with appropriate function codes on the control function interface CFI2. A memory address can also be supplied from a free pointer register FREPTR, which is used to store the address of the head of the free list, and an old cell address register OCA, which is used in deleting references. A multiplexer MPX is used to select which of these three sources of address information will be sent on the address portion ADDR2 of the cell access interface CAI2. An arithmetic and logic unit ALU is provided for computation and testing. A temporary register SAVE is used for computations and exchanges. Simple transfers are accomplished directly via an internal bus IB. The entire group of cell content registers CELL is transferred on the cell access interfaces as a unit, but one of its component registers is transferred on the internal bus IB. A select register S has the special function of selecting the first pointer CARC or second pointer CDRC for transfer. The delimiter register DLIM is used to partition logical memory space into a dynamic region in which cell allocation is handled by the garbage manager GM, and a static region managed by the list processor LP as will be explained in the discussion of Partial Tag Encoding in Pointers.

FIGS. 5 through 8 define important processes of the garbage manager GM using the functional units of FIG. 4 and the following special terms and conventions:

EXP—A tag value indicating use of the expanded counter format of FIG. 3.

NIL—A special pointer value designating an empty list.

MAX—The maximum reference counter value that can be represented in the small counter format of FIG. 2.

MIN—The minimum counter value representing that only one reference is present.

MEM(X)←Y—The operation of storing the contents of a register Y into a cell of memory MEM whose address is in a register X.

Y2←MEM(X2)—The operation of retrieving a cell of memory MEM whose address is in a register X2, and placing the contents of that cell into a register Y2.

CELL—Indicates the entire group of registers CTRC, TAGC, CARC, CDRC is referenced or updated, except that when transfer is to or from memory MEM, the extended portion XC of the reference counter CTRC is not included in the transfer.

CELL(S)—References the register CARC when the contents of the register S are zero, and references the register CDRC when the contents of S are one.

CELL(CDRC)—Indicates transfers which take place as if the entire group of registers CELL were participating, but in which only the register CDRC is allowed to be updated.

NEW(CA) and REL(CA)—Indicate invocation of the obtain cell process NEW and the release cell process REL, which will be described subsequently.

Figure 5:
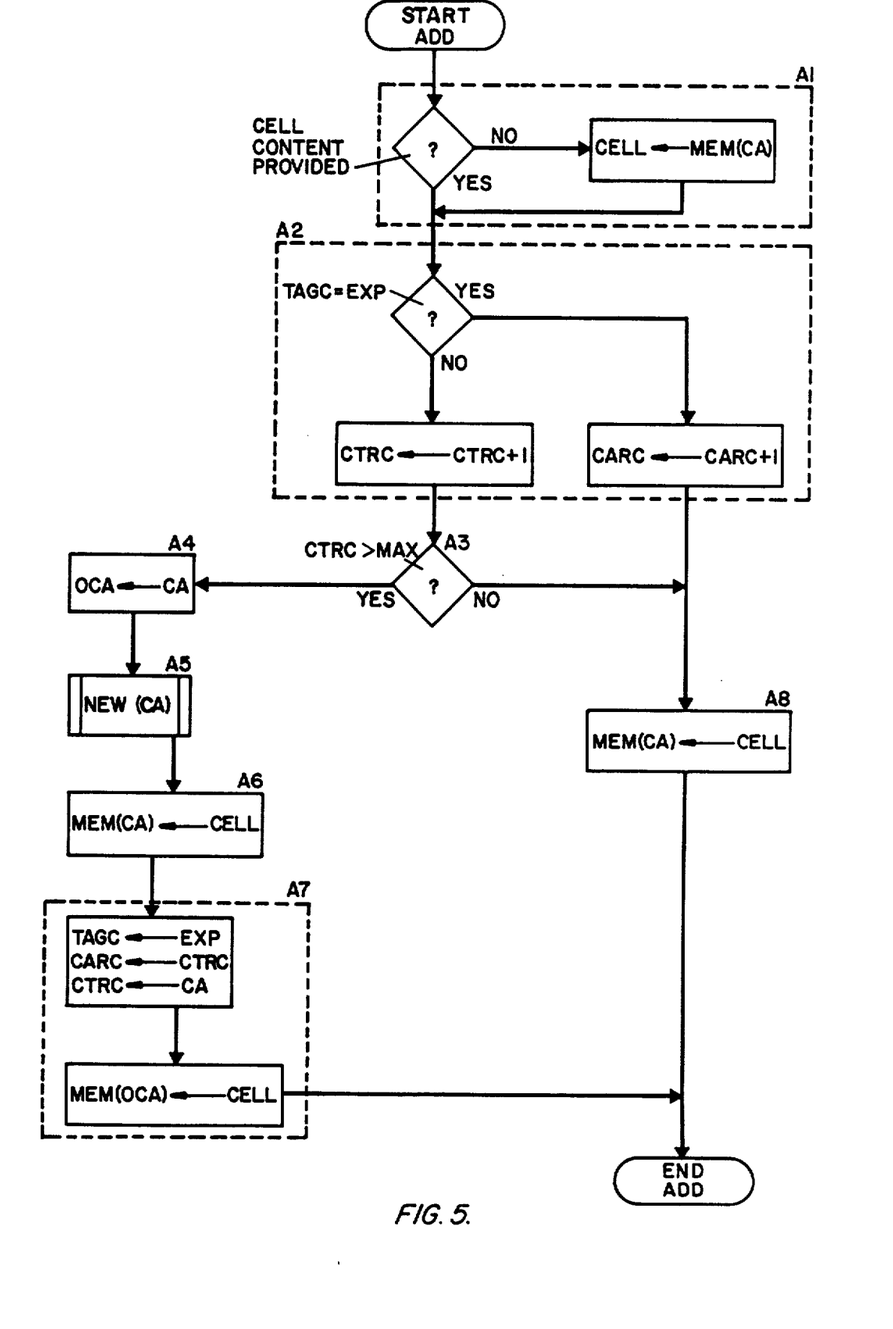
FIG. 5 is a flow diagram of the garbage collection algorithm for adding references.

FIG. 5 defines the process the garbage manager GM uses in response to a request from the list processor LP to add a reference to a cell. The list processor LP must supply a cell address, and may supply the cell contents. Step A1 checks whether cell contents have been supplied, and if not, the garbage manager GM will retrieve them from the memory system MEM. The reference counter is then identified and incremented in step A2. Step A3 checks for small counter overflow. If a previously small format cell's counter becomes larger than can be accommodated within the format, then cell expansion will take place as follows. The garbage manager GM obtains an additional cell from the free list via step A5, which step A6 uses to contain the CAR, CDR, and TAG of the original cell. Step A7 places into the original cell in memory the expanded count, a link to the new cell, and an appropriate tag. Step A8 saves the updated reference counter in memory in the case where cell expansion did not take place.

Figure 6:
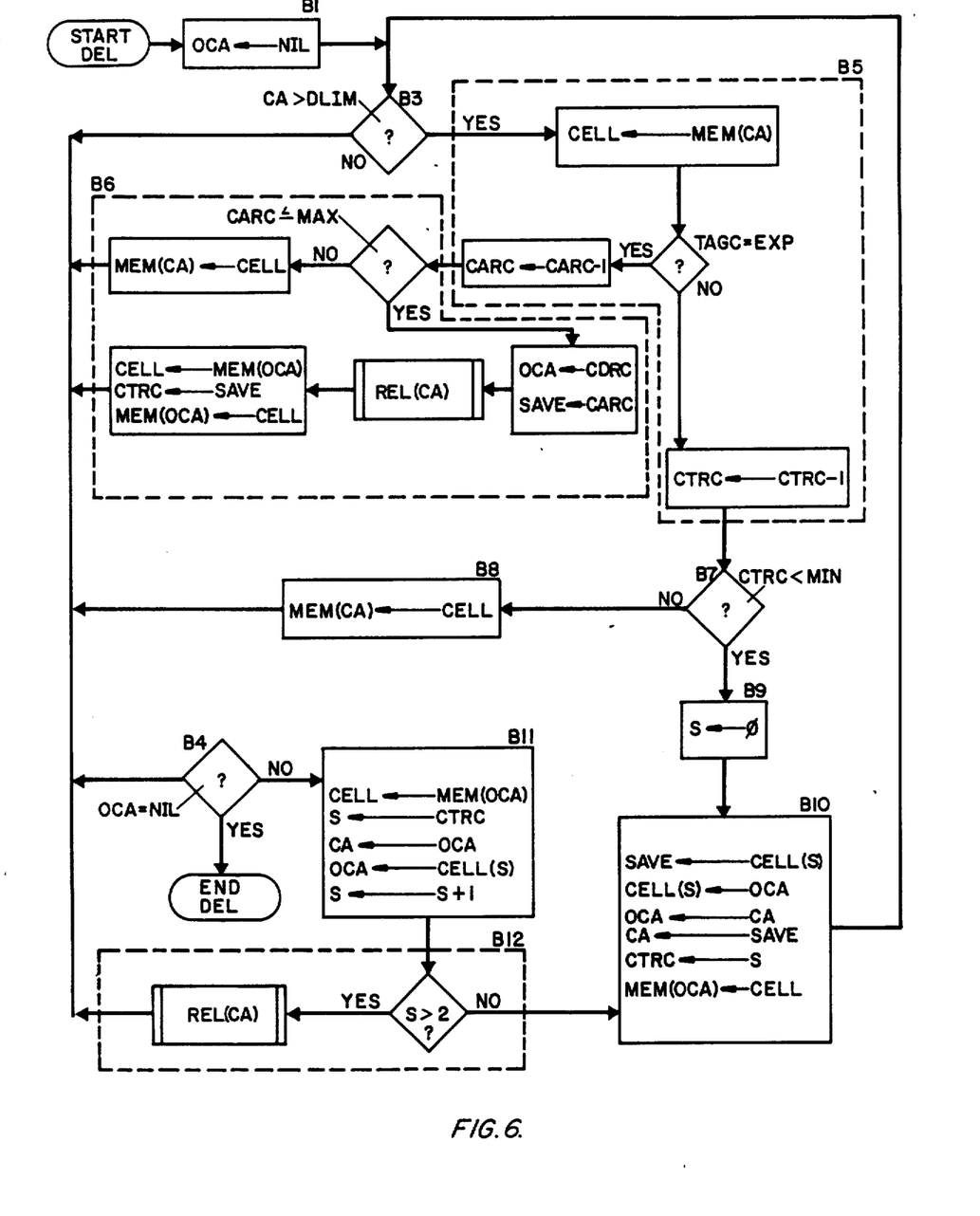
FIG. 6 is a flow diagram of the garbage collection algorithm for deleting references.

FIG. 6 defines the process of deleting a reference to a cell. In step B1 the old cell address register OCA is initialized to the value NIL. If in step B3 the cell is found to be not in the dynamic portion of memory, then no further processing of the cell is required, and the terminating step B4 is invoked. At step B4 the old cell address OCA is checked to see whether this deletion was the result of an original request, in which case the process terminates. If in step B3 the reference is to a cell in the dynamic portion of memory (i.e. not an atom), then the cell is retrieved and its counter decremented in step B5. In step B6 the counter portion of an expanded format cell is returned to memory, and expanded counters decrementing below the threshold of expansion cause the cell to be reformatted as a small counter cell, with one of the two cells of the expanded format being returned to the free list. If in step B7 the last remaining reference to the cell has not been deleted then the small format cell is stored in memory via step B8, otherwise the cell must be returned to the free list. Returning the cell to the free list requires deleting any references which the cell makes to other cells, a process handled entirely within the garbage manager GM. This recursive function is accomplished without a stack by using the cells being freed to store information which is local to each level of recursion. The CA register contains the address of the cell of current interest. If there was a previous cell, its address is in OCA. A still prior cell address is stored in the cell addressed by OCA. The S register is used to indicate which pointer within the current cell is being processed, the CAR or CDR. When a cell is to be freed, then S is set to zero in step B9, which selects the CAR. In step B10 an exchange is then performed in which the old cell address OCA is moved into CELL(S), the current cell address CA is moved to OCA, the former contents of CELL(S) are moved to CA, which will become the new cell address of interest, and the value of S itself is saved in the counter field of the current cell. The current cell is then stored back to memory so that the S and OCA values in it, as well as the CDR pointer, may be recalled when needed. The process of considering the current cell address in register CA as a deleted reference then begins again with step B3. When such process is finished, the value in register OCA is used to determine whether it was an initial deletion requested by the list processor LP which has finished, or whether it is a deletion that was invoked by the garbage manager GM. In the latter case, the OCA register is used in step B11 to retrieve the former cell of interest, whose contents are used to restore other necessary information that was saved earlier. Then S is incremented, and it selects the CDR of the current cell for deletion. When control is again returned to step B11, incrementing S reveals neither CAR or CDR to be selected, so the current cell is ready to be returned to the free list via step B12, and its handling is complete.

Figure 7:
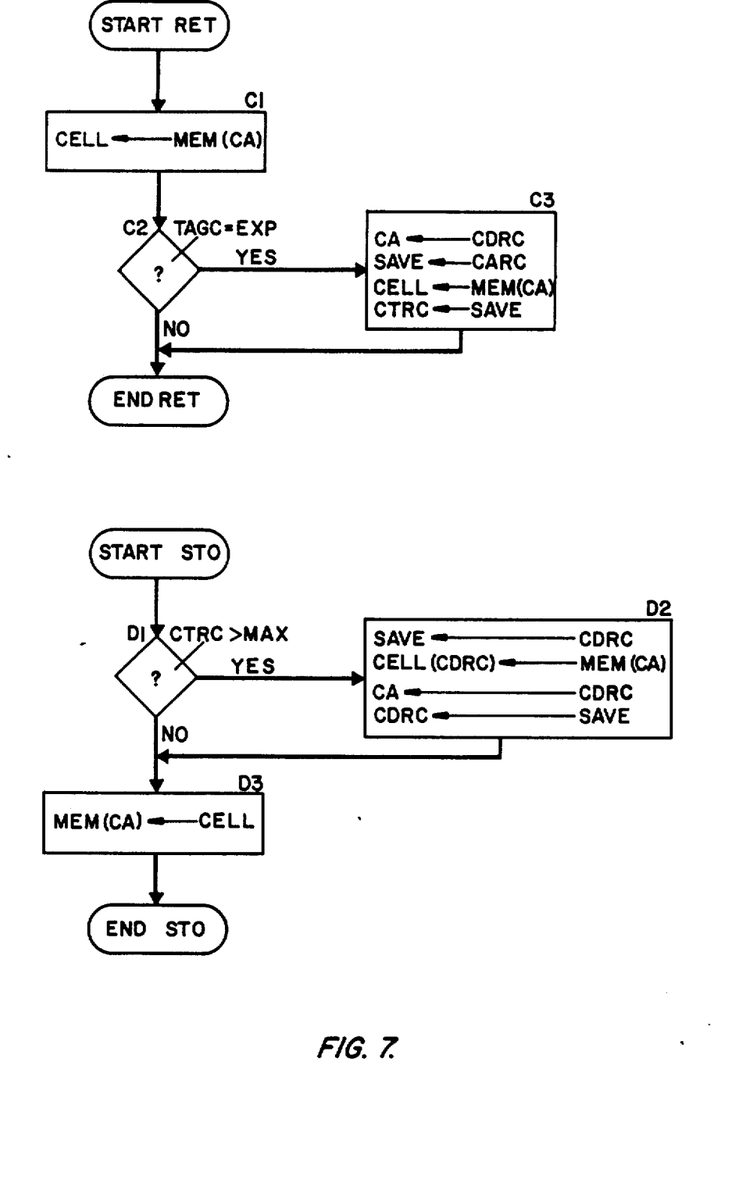
FIG. 7 is a flow diagram of the garbage collection algorithm for accessing cells of various types in a uniform manner.

FIG. 7 defines how the garbage manager GM responds to requests from the list processor LP for cell storage and retrieval. On a retrieval function RET the cell contents are obtained from memory in step C1. If in step C2 the cell turns out to be in expanded format, then the second cell of the pair is also be retrieved, and the information it contains is passed back to the list processor LP. On a store function STO step D1 determines whether or not the cell is in expanded format by looking at the count value of the cell, which is always maintained to full precision in communications between the garbage manager GM and the list processor LP. If the cell is in expanded format, then the first member of the cell pair is retrieved in step D2 in order to obtain the address of the second cell of the pair, which is then used by step D3 to store the CAR, CDR, and TAG from the list processor.

Figure 8:
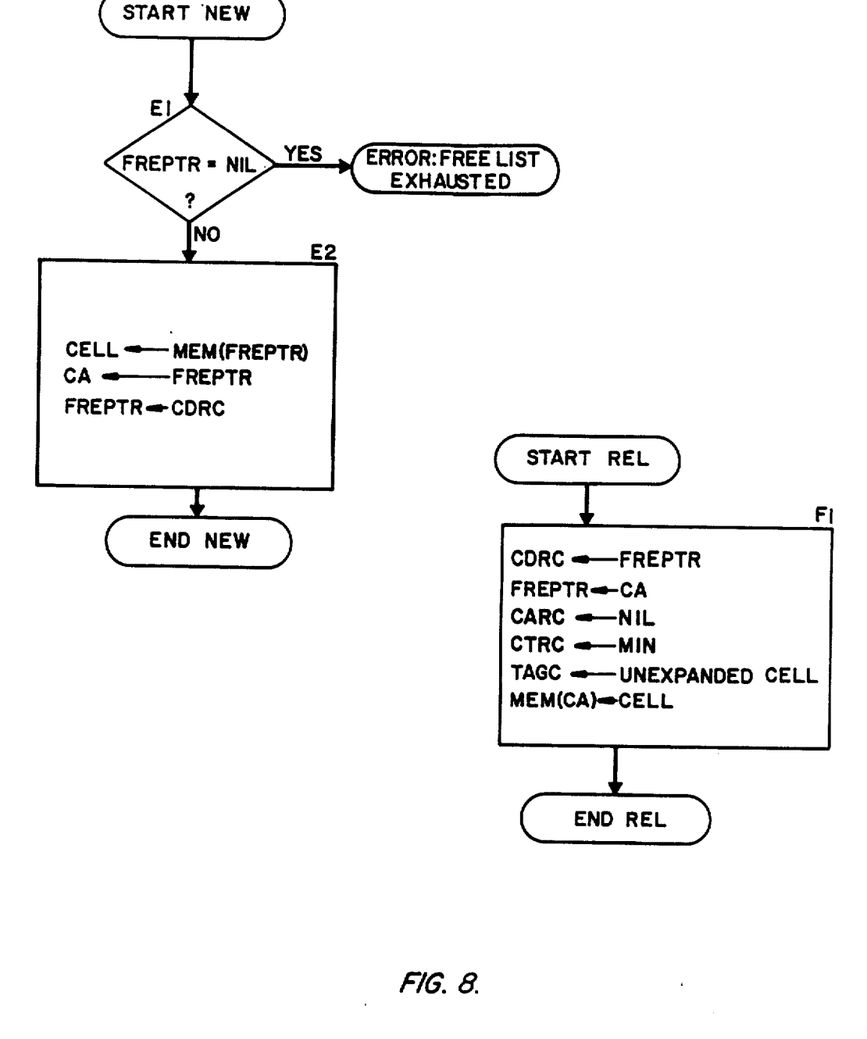
FIG. 8 is a flow diagram of the garbage collection algorithm for obtaining cells from the free list and returning free cells to the free list.

FIG. 8 defines the processes of obtaining a cell from the free list, NEW, and of releasing a cell to the free list, REL. These processes may be invoked by the list processor LP by using the function codes for retrieval RTV and storage STR on the control function interface CFI1, or by other garbage manager GM processes. In the obtain cell process NEW, step E1 checks for possible free list exhaustion, and step E2 obtains the address of the first cell from the free list, putting that address in the cell address register CA for communication back to the invoking process. In the release process REL, the cell to be released is threaded on to the head of the free list by updating its pointers and updating the free list pointers as shown in step F1.

CACHE OPERATION

While correct logical function of the garbage manager GM is not dependent on any particular implementation of the memory subsystem, its efficiency is. As seen from the preceding process descriptions, the garbage manager generates additional memory references, many of which are store operations. References to the same cell are frequently close together in time. Therefore, if the memory subsystem uses a high speed cache buffer having the characteristic that every update operation is not written to main memory (i.e. main memory is updated only when the contents of that particular cache cell must be evacuated to hold another memory cell), then overall performance will be greatly improved.

ADDITION AND DELETION OF REFERENCES BY THE LIST PROCESSOR

The list processor LP exercises a great deal of control over the efficiency of the garbage manager GM by the frequency with which it requests addition and deletion of references. Whenever the list processor performs a modular operation over a list structure which is static for the duration of the operation, however complex that operation may be, the reference control requests may be deferred until the end of the operation. This results in the elimination of many intermediate reference control operations. For example, consider a list processing primitive which scans a list looking for a particular item. Each operation in updating a list scanning pointer to the next element in the list could be viewed as requiring one reference deletion and one reference addition. Alternately, knowing the structure of the operation being performed, it becomes necessary to perform only one reference addition (for the result at the end of the operation), and one deletion (for the initial argument structure, again performed at the end of the operation). To go even further, reference addition and deletion in the above example can be made the responsibility of whatever routine invoked this function, allowing that routine to also optimize its reference control operations.

PARTIAL TAG ENCODING IN POINTERS

A further efficiency consideration concerns the ability to determine whether a referenced memory item is a dynamically allocated cell, or a static entity such as an atom, by examining the pointer to the item. This may be done, for example, by partitioning the address space into static and dynamic portions as described above, which is particularly convenient in virtual memory or segmented memory systems. If such is the case, then addition and deletion of references to static items will not require additional memory references. If such is not the case, then the items will have to be retrieved and their tag fields examined even if they are static. Stack entries are considered static for this purpose.

DESCRIPTION OF ALTERNATE EMBODIMENTS

The embodiment described above has the advantage that it easily interfaces with certain types of existing list processing systems. Those skilled in the art will recognize various alternate embodiments, some of which are more suitable for their purposes. Selected ones are briefly described below.

SOFTWARE IMPLEMENTATIONS

Dynamic expansion of reference counters could be emulated by list processing software running on a conventional data processor. This has been accomplished to verify the concepts and principles of the method of garbage collection set forth above. Software implementation also has a use in studying the behavior of the garbage manager for alternate configurations of reference counter size and expansion format.

ZERO SIZE REFERENCE COUNTERS

The small counter format cell may be so structured that it has no space allocated for a reference counter in which case it is presumed to have the value one. When a reference to such a cell is deleted, then the cell is returned to the free list. When a reference is added, the cell must be expanded. The effectiveness of such small counters depends upon the observation that a majority of counters have the value one in many list processing applications, and upon the ability of a cache memory to handle temporary excursions above the value one without actually expanding and contracting the cell in memory. The cache might, for example, employ a third counter size chosen to handle most such excursions.

Using such a counter size, the reference counter method could be more easily adapted to a list processing system which does not have any bits reserved for garbage collection purposes. This includes some systems which use Baker's algorithm. A second principle advantage of a zero count system is that it allows all non-data bits, such as tags, to be moved out of the cell and into the reference (pointer) to the cell. In mark and sweep garbage collection this cannot be done because the cells are accessed during the sweep phase by a scan of memory independent of the pointers to the cell. In a normal reference counter system it cannot be done because the counter itself must be present. To remove all such non-data bits, fully encoding the tag in the pointers to the cell, has the advantage that the type of cell is known from the pointer without having to retrieve the cell, and the advantage that cell data content may use the full memory cell size. Standard 32 bit data formats could, for example, be used in a processor employing a common 32 bit memory width.

OTHER ARRANGEMENTS OF CTR, TAG, CAR, CDR AND LINK

Figure 9:
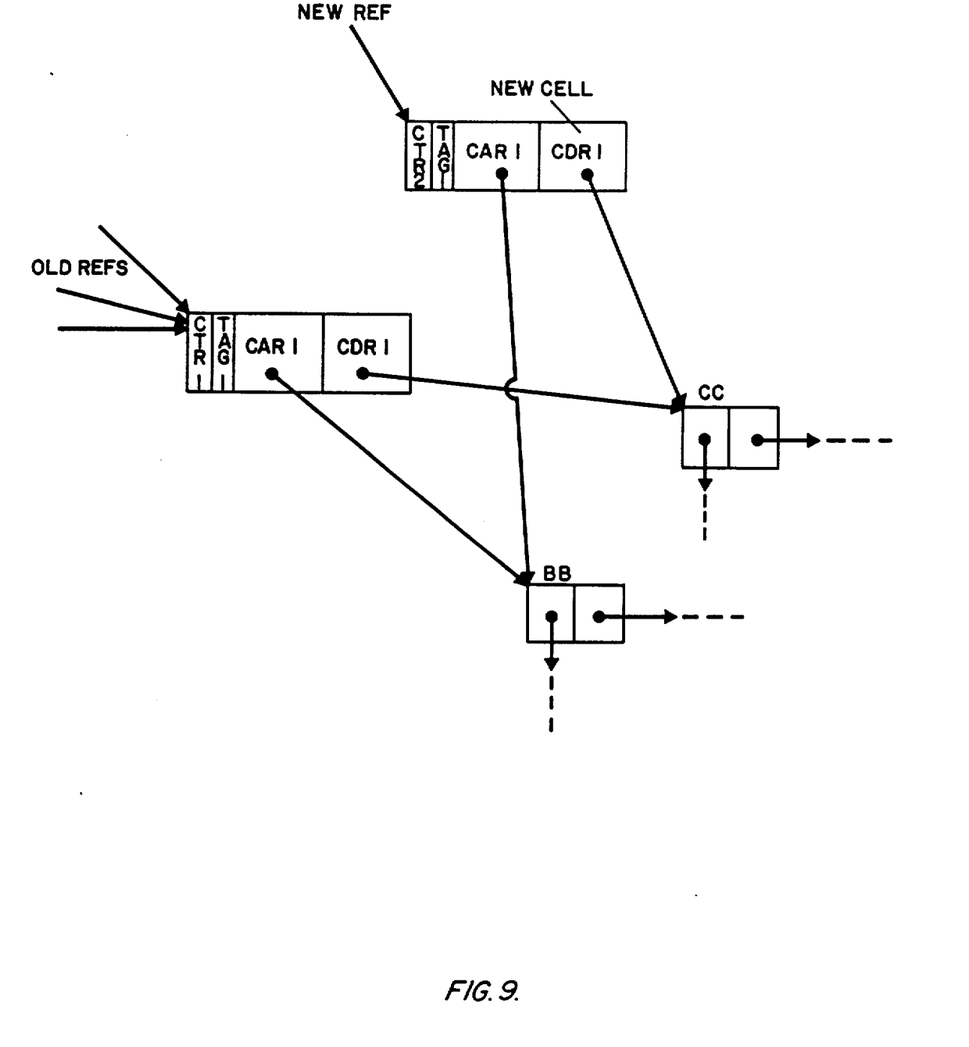
FIG. 9 shows the data structures used to implement an alternate embodiment of the invention in which reference counter information and references to a list structure may be distributed among several memory cells.

When a counter must be expanded, there are many ways of allocating the cell information among the two cells. In addition to just placing the information differently than in FIG. 3, the counter information may be distributed between the two cells. FIG. 9 shows an expansion in which an original cell OLDCELL is left completely unmodified by the expansion, and a new cell NEWCELL contains a new counter CTR2 of a the same size as the old counter CTR1. The added reference NEWREF is adjusted to point to the new cell NEWCELL. The pointers CAR1 and CDR1 of the new cell NEWCELL are copied from the original cell OLDCELL. In this way the link is from the new cell NEWCELL to the list structure BB and CC being referenced by the original cell OLDCELL, rather than between NEWCELL and OLDCELL. This distribution has the result that no reference is added to the original cell OLDCELL, and its reference counter CTR1 may remain at the same value. The new reference NEWREF is to the new cell NEWCELL. The new cell NEWCELL then adds new references to two other already existing cells BB and CC, whose reference counters must be incremented, and which may of course have to be expanded if their reference counters are already at maximum value. In the worst case the entire structure being referenced has all its reference counters at maximum value, and thus the entire structure is copied through individual expansions of each of its cells.

This distribution of counter information among several small counters has the advantage of maintaining a uniform cell format, and of eliminating the extra retrieve operations to get the second member of an expanded cell pair. Its disadvantage is that list processing software which employs list splicing techniques would need to be carefully examined to assure that it would produce the anticipated result.

Strategies may be mixed. For example, zero size counters may be maintained for dynamically allocated numeric quantities resulting from computation, while small counters of some other size are used for list cells containing pointer pairs. Any of the distribution schemes, or a mix in which some cells are expanded one way and some another, may be used with the various cell types.

ADDITION TO A CONVENTIONAL DATA PROCESSOR

The function of the garbage manager GM may be placed on the memory bus of a conventional data processor, in a manner similar to a memory module or peripheral controller. It may include its own memory, or re-direct references again on the bus to the system's memory. Since there are no dedicated signal paths for the reference control information, it would be communicated by some other means, as for example by storing a special code in a fixed address, or by accessing one of several fixed addresses. The "store immediate" instructions of some processors would be suitable for this purpose. Such an embodiment would allow efficient use of the invention in conjunction with a conventional processor.

CLOSELY INTEGRATED PROCESSOR AND GARBAGE MANAGER

The list processor and garbage manager may share data paths, functional units, and sequencers. This would require a close coupling of the two, but could produce an economic embodiment for purposes such as implementation of a list processor on a VLSI (Very Large Scale Integration) chip.

MULTIPLE PROCESSORS AND HIGHLY PARALLEL PROCESSORS

Where there are multiple processors and each has its own memory, each would also have its own garbage manager. The simplicity and determinacy of garbage management using the present invention would permit simpler processors and would make coordination among the processors easier. The immediate identification and reuse of garbage cells minimizes the amount of memory required for each processor.

Where there are memory modules separate from the processors, with some means of interconnecting the processors and the memories, a garbage manager could be included either with each processor, or with each memory module. In the case of including a garbage manager with each processor, some means would need to be provided to assure consistent results when two or more processors were updating elements of the same memory module. In the case of including a garbage manager with each memory module, interconnection traffic would be reduced (because expansions and second cell accesses are handled locally), and the problem of synchronizing multiple access would be somewhat reduced.

The above configurations avoid the problem typically encountered of having to scan the pointers of all other memory modules when looking for garbage within a particular module. This becomes more important as memories become larger and are partitioned into more modules to support parallel processing.

Garbage management in the manner prescribed by the invention is also compatible with methods of controlling the sharing of transient list structures, such as copying lists, or use of a forwarding table. The garbage manager may even be used to implement the operation of a forwarding table by merely marking the table entries as being in expanded format, and by providing some means to inhibit the de-expansion of table entries (which could be as simple as initializing each entry with a count exceeding the maximum small format counter value).

Those skilled in the art will recognize that many other embodiments may be found which use the basic principles of the invention.

What is claimed is:

1. In a data processing system having a list processor and a memory formed of cells, each cell having two pointers, the first pointer being the CAR and the second pointer being the CDR, each cell also having a code (TAG) to indicate the type of cell, some of the cells being organized into linked lists by the pointers referencing other cells, which lists are continually being modified by some new cells being added from a free list and some cells being rendered inaccessible by destruction of references to such cells, a reference counter being attached to each cell, each time a new reference to the cell is created the counter being incremented and each time a reference to the cell is destroyed the counter being decremented, when the counter becomes zero the cell is returned to the free list, a real-time garbage collection system comprising:

means for obtaining an additional cell from the free list for each original cell whose reference counter reaches its maximum value;

means for storing the contents of the original cell, linking information relating the two cells to the original list structure, and additional reference count information in the two cells; and means for incrementing and decrementing the additional reference count information provided by the two cells to reflect created or destroyed references.

2. The data processing system specified in claim 1 in which the two linked cells provide additional space for the provision of an expanded counter which can be further incremented.

3. The data processing system specified in claim 1 in which the additional cell provides a new counter whereby the new reference is directed to the additional cell, the new counter being available for additional incrementation.

4. The data processing system of claim 2 wherein the handling of the reference counters is under the control of a garbage manager means, the garbage manager means maintaining the reference counters and the free list and handling memory references and cell formats on behalf the list processor.

5. The data processing system of claim 4 in which the garbage manager means in response to a command from the list processor that a new reference has been created operates on the referenced memory cell incrementing the reference counter, in the event that the reference counter has reached its maximum value, the garbage manager means obtains an additional cell from the free list in which is stored the contents of the original cell, and the original cell is provided with an expanded counter and a link to the additional cell.

6. The data processing system of claim 4 in which the garbage manager means in response to a command from the list processor that a reference has been destroyed operates on the referenced memory cell, decrementing its reference counter, in the event the reference counter is decremented to zero the garbage manager returns the cell to the free list.

7. The data processing system of claim 6 in which the garbage manager means when decrementing a reference counter of an expanded cell obtains a maximum value equal to or less than the value of the small reference counter of an original cell restores the contents of the original cell to the original cell and returns the additional cell to the free list.

8. The data processing system of claim 4 in which the garbage manager means in response to a command from the list processor to retrieve a cell from memory retrieves the indicated cell, if the cell is in expanded format the garbage manager means also retrieves the additional cell and provides the cell content to the list processor.

9. The data processing system of claim 8 in which the cell content provided to the list processor is the TAG, CAR and CDR of the original cell and the reference counter in expanded format.

10. The data processing system of claim 4 in which the garbage manager means in response to a command from the list processor to store a cell into memory, in the event that the cell is in original format the garbage manager means stores the cell, in the event that the cell is in the expanded format, the garbage manager means retrieves the link to the additional cell which the garbage manager means uses to store the TAG, CAR and CDR.

11. The data processing system of claim 3 wherein the handling of the reference counters is under the control of a garbage manager means, the garbage manager means maintaining the reference counters and the free list and handling memory references and cell formats on behalf the list processor.

12. The data processing system of claim 11 in which the garbage manager means in response to a command from the list processor that a new reference has been created operates on the referenced memory cell incrementing the reference counter, in the event that the reference counter has reached the maximum value, the garbage manager means obtains an additional cell from the free list in which its store the TAG, CAR and CDR of the original cell and a reference counter indicating a count of one and changes the new reference to point to the additional cell.

13. The data processing system of claim 1 in which the handling of the reference counters is implemented by software.

14. The data processing systems of claim 1 in which the cell has no space allocated for the arbitrarily small size reference counter, in which case the reference counter is presumed to have the value one.

15. The data processing system of claim 1 wherein the handling of the reference counters is under the control of a garbage manager means which is an intergral part of the list processor.

16. The data processing system of claim 1 wherein the handling of the reference counters is under the control of a garbage manager means which is interposed between the list processor and the memory.

17. The data processing system of claim 1 in which there are multiple list processors and multiple memories interconnected together into a coordinated system with a garbage manager means for each processor.

18. The data processing system of claim 1 in which there are multiple list processors and multiple memories interconnected together into a coordinated system with a garbage manager means for each memory.

19. The data processing system of claim 1 in which a high speed buffer memory is used for cell manipulation to reduce the number of references to the main memory.

20. The data processing system of claim 19 in which the cells used in the high speed buffer have a counter designed to eliminate cell expansion for brief excursions above maximum small counter value.

21. A method for controlling reference counts in a computer system in which a count of how many pointers which reference blocks of memory are held in association with associated blocks of memory, and in which the count is incremented and decremented as pointers to the blocks are created and destroyed, and in which there is a means of obtaining unused blocks of memory and their associated counters, comprising, when a new reference pointer is created which would require a counter associated with a first block to be incremented beyond its maximum value:

obtaining an unused second block of memory;

copying the contents of the first block, including pointers, to the second block, the copying of any pointers from the first to second block being treated normally as the creation of new pointers;

setting the counter of the second block to indicate a single reference and leaving the counter of the first block unchanged; and adjusting the new reference pointer to point to the second block.

22. A method for controlling reference counts in a computer system in which a count of how many pointers which reference blocks of memory are held in association with associated blocks of memory, and in which the count is incremented and decremented as pointers to the blocks are created and destroyed, and in which there is a means for obtaining unused blocks from an unused memory pool and for adding blocks to the unused memory pool, comprising:

initially designating all blocks of memory as normal;

when a pointer is created which would require incrementing the counter of a normal first block beyond its maximum value, obtaining a second block from the unused pool, redistributing the information from the first block into the two blocks, placing a linking pointer to the second block in the first block, allocating a larger reference counter in either block, designating the two blocks as being in expanded format, and incrementing the resulting larger counter.

* * * * *